United States Patent
Jeong et al.

(10) Patent No.: US 11,042,868 B2
(45) Date of Patent: Jun. 22, 2021

(54) ELECTRONIC DEVICE AND METHOD FOR SUPPORTING AUTOMATIC WI-FI CONNECTION WITH ENHANCED SECURITY METHOD WHEN MAKING ELECTRONIC WALLET PAYMENT

(71) Applicant: Samsung Electronics Co., Ltd., Gyeonggi-do (KR)

(72) Inventors: Heeyoung Jeong, Gyeonggi-do (KR); Younghwan Ryu, Gyeonggi-do (KR); Suwook Seok, Gyeonggi-do (KR); Dongho Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 49 days.

(21) Appl. No.: 16/259,394

(22) Filed: Jan. 28, 2019

(65) Prior Publication Data

US 2019/0236585 A1 Aug. 1, 2019

(30) Foreign Application Priority Data

Jan. 26, 2018 (KR) ......................... 10-2018-0010075

(51) Int. Cl.
*G06Q 20/32* (2012.01)
*G06Q 20/20* (2012.01)
(Continued)

(52) U.S. Cl.
CPC ....... *G06Q 20/3278* (2013.01); *G06Q 20/204* (2013.01); *G06Q 20/327* (2013.01);
(Continued)

(58) Field of Classification Search
CPC ............... G06Q 20/3278; G06Q 20/34; G06Q 20/40145; G06Q 20/3274; G06Q 20/36;
(Continued)

(56) References Cited

U.S. PATENT DOCUMENTS

| 2007/0136490 A1* | 6/2007 | Freitag | H04W 8/22 709/238 |
| 2012/0290287 A1* | 11/2012 | Fux | G06F 9/454 704/8 |

(Continued)

FOREIGN PATENT DOCUMENTS

| KR | 10-2012-0005645 | 1/2012 |
| KR | 10-1639045 | 7/2016 |

OTHER PUBLICATIONS

"If you use Wi-Fi free, you'll get hurt!" http://www.boannews.com/media/view.asp?idx=54100, Apr. 4, 2017.
(Continued)

*Primary Examiner* — Alexander G Kalinowski
*Assistant Examiner* — Sanjeev Malhotra
(74) *Attorney, Agent, or Firm* — The Farrell Law Firm, P.C.

(57) ABSTRACT

An electronic device is provided and includes a housing; first and second near-distance wireless communication circuits configured to support wireless connection to an access point (AP); a cellular wireless communication circuit; a touchscreen display; a processor connected to the first and second near-distance wireless communication circuits, the cellular wireless communication circuit, and the display; and a memory connected to the processor which stores an application program configured to make payment using the first near-distance wireless communication circuit and instructions which cause the processor to perform a transaction with an external point-of-service (POS) device via the first near-distance wireless communication circuit; receive a result of the transaction comprising receipt information and connection information, the connection information comprising credential information; and connecting to the AP through the second near-distance wireless communication (Continued)

circuit based on the credential information after receiving the transaction result.

11 Claims, 10 Drawing Sheets

(51) Int. Cl.
  *H04W 12/47* (2021.01)
  *H04W 12/71* (2021.01)
(52) U.S. Cl.
  CPC ........ *G06Q 20/3226* (2013.01); *H04W 12/47* (2021.01); *H04W 12/71* (2021.01)
(58) Field of Classification Search
  CPC .. G06Q 20/4012; G06Q 20/405; G06Q 20/10; G06Q 20/20; G06Q 20/204; G06Q 20/32; G06Q 20/322; G06Q 20/3224; G06Q 20/3255; G06Q 20/327; G06Q 20/363; G06Q 30/06; G06Q 40/02; H04W 12/06; H04W 12/08; H04W 12/00522; H04W 84/12; H04W 4/029; H04W 4/70; H04W 84/18; G06K 7/1417; G06K 7/1434; G06K 7/0004; G06K 9/00; G06F 21/36; G06F 9/023; H04L 63/0861; G07F 9/023
  USPC ................. 705/39, 44, 72, 75; 701/2; 704/8; 726/7, 26; 709/238; 713/156; 717/174; 382/118
  See application file for complete search history.

(56) References Cited

U.S. PATENT DOCUMENTS

| | | | | |
|---|---|---|---|---|
| 2013/0103585 A1* | 4/2013 | Carapelli | ............... | G06Q 20/32 705/44 |
| 2013/0268400 A1 | 10/2013 | Ballard et al. | | |
| 2014/0075523 A1 | 3/2014 | Tuomaala et al. | | |
| 2014/0112551 A1* | 4/2014 | Terwilliger | ........... | H04W 12/08 382/118 |
| 2014/0115708 A1* | 4/2014 | Terwilliger | .......... | G06K 7/1417 726/26 |
| 2014/0279479 A1 | 9/2014 | Maniar et al. | | |
| 2015/0066802 A1 | 3/2015 | Goulart et al. | | |
| 2015/0128127 A1* | 5/2015 | Dumais | ..................... | G06F 8/61 717/174 |
| 2015/0172288 A1* | 6/2015 | Terwilliger | .......... | G06K 7/1417 726/7 |
| 2015/0221149 A1 | 8/2015 | Main et al. | | |
| 2015/0242969 A1* | 8/2015 | Pallas | .................... | G06Q 50/06 705/39 |
| 2016/0132053 A1* | 5/2016 | Schwarz | ................ | B60R 25/04 701/2 |
| 2016/0155108 A1 | 6/2016 | McLaughlin et al. | | |
| 2016/0210616 A1* | 7/2016 | Lee | ........................ | H02J 50/80 |
| 2016/0234765 A1* | 8/2016 | Tannenbaum | .......... | H04L 67/12 |
| 2016/0247144 A1* | 8/2016 | Oh | ........................ | G06Q 20/321 |
| 2016/0253651 A1* | 9/2016 | Park | ....................... | G07F 9/023 705/39 |
| 2016/0253666 A1* | 9/2016 | Lee | ..................... | G06Q 20/3223 705/72 |
| 2016/0253669 A1* | 9/2016 | Yoon | .................... | G06Q 20/327 705/75 |
| 2016/0254918 A1* | 9/2016 | Liu | ..................... | H04L 63/0823 713/156 |
| 2017/0017952 A1* | 1/2017 | Choi | .................... | G06Q 20/321 |
| 2017/0063457 A1* | 3/2017 | Yamasaki | .............. | H04B 10/80 |
| 2017/0139535 A1* | 5/2017 | Files | ...................... | G06F 3/0412 |
| 2017/0337542 A1* | 11/2017 | Kim | ....................... | G06F 3/048 |
| 2018/0033013 A1* | 2/2018 | Park | ..................... | G06Q 20/325 |
| 2018/0068312 A1* | 3/2018 | Kim | ..................... | G06Q 20/227 |

OTHER PUBLICATIONS

International Search Report dated May 7, 2019 issued in counterpart application No. PCT/KR2019/001053, 11 pages.

* cited by examiner

ELECTRONIC DEVICE AND METHOD FOR SUPPORTING AUTOMATIC WI-FI CONNECTION WITH ENHANCED SECURITY METHOD WHEN MAKING ELECTRONIC WALLET PAYMENT

CROSS-REFERENCE TO RELATED APPLICATION(S)

This application is based on and claims priority under 35 U.S.C. § 119(a) to Korean Patent Application No. 10-2018-0010075, filed on Jan. 26, 2018, in the Korean Intellectual Property Office, the disclosure of which is incorporated by reference herein in its entirety.

BACKGROUND

1) Field

The present disclosure relates in general to an electronic wallet function of an electronic device and, more particularly, to an electronic wallet function of an electronic device at the offline merchant to automatically connect to wireless fidelity (Wi-Fi) of the offline merchant.

2) Description of Related Art

Wireless local area network (WLAN) communication (Institute for Electrical and Electronics Engineers (IEEE) 802.11 standards), which is generally known as Wi-Fi, has continuously evolved in a complementary relationship with wireless mobile communication. Wi-Fi is a technology for providing an Internet access function to electronic devices located within a specified radius from a place where an access point (AP), that is, a wireless router, is installed and is used at home, office, school, airport, restaurant, or café.

Since Wi-Fi is free-of-charge unlike wireless mobile communication, commercial facilities, such as a hotel, a restaurant, or a cafe, provide a Wi-Fi service for the convenience of customers. Customers can use the Wi-Fi service by asking a staff member a Wi-Fi password or obtaining the password printed on a receipt and entering the obtained password directly into an electronic device.

However, the customer is inconvenienced by having to directly enter a Wi-Fi password into an electronic device in order to use the Wi-Fi service at conventional commercial facilities. If the Wi-Fi password is disclosed to a person other than the customer, the commercial facilities have no way of preventing the person from accessing Wi-Fi.

SUMMARY

According to an embodiment of the disclosure provides a method and an electronic device that enable a user that performs payment using an electronic wallet function of an electronic device at an offline merchant to automatically connect to Wi-Fi of the offline merchant.

According to an aspect of the present disclosure, an electronic device is provided. The electronic device includes a housing; a first near-distance wireless communication circuit; a second near-distance wireless communication circuit configured to provide a wireless coverage broader than the first near-distance wireless communication circuit, and support wireless connection to an access point (AP); a cellular wireless communication circuit; a touchscreen display exposed through a portion of the housing; a processor positioned in the housing and connected to the first near-distance wireless communication circuit, the second near-distance wireless communication circuit, the cellular wireless communication circuit, and the touchscreen display; and a memory positioned in the housing and operatively connected to the processor, wherein the memory is configured to store an application program configured to make payment using the first near-distance wireless communication circuit and instructions, and wherein the instructions, when executed, cause the processor to perform a transaction with an external point-of-service (POS) device via the first near-distance wireless communication circuit using the application program; receive a result of the transaction including receipt information and connection information from an external server via the cellular wireless communication circuit using the application program, wherein the connection information including credential information for connecting to the AP; and connect to the AP through the second near-distance wireless communication circuit based on the credential information after receiving the result of the transaction.

According to another aspect of the present disclosure, a method for an electronic device to automatically connect to an AP, wherein the electronic device includes a first near-distance wireless communication circuit, a second near-distance wireless communication circuit configured to provide a wireless coverage broader than the first near-distance wireless communication circuit and support wireless connection to an AP, and a cellular wireless communication circuit. The method includes performing a transaction with an external POS device via the first near-distance wireless communication circuit using an application program; receiving a result of the transaction including receipt information and connection information from an external server via the cellular wireless communication circuit using the application program, wherein the connection information including credential information for connecting to the AP; and connecting to the AP through the second near-distance wireless communication circuit based on the credential information after receiving the result of the transaction.

According to another aspect of the present disclosure, a non-transitory machine-readable storage medium that records a program to control an operation of an electronic device, wherein the electronic device includes a first near-distance wireless communication circuit, a second near-distance wireless communication circuit configured to provide a wireless coverage broader than the first near-distance wireless communication circuit and configured to support wireless connection to an AP, a cellular wireless communication circuit, and a processor. The program causes the processor to perform a transaction with an external POS device via the first near-distance wireless communication circuit using an application program; receive a result of the transaction including receipt information and connection information from an external server via the cellular wireless communication circuit using the application program, wherein the connection information includes credential information for connecting to the AP; and connect to the AP through the second near-distance wireless communication circuit based on the credential information after receiving the result of the transaction.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION

Figure 1:
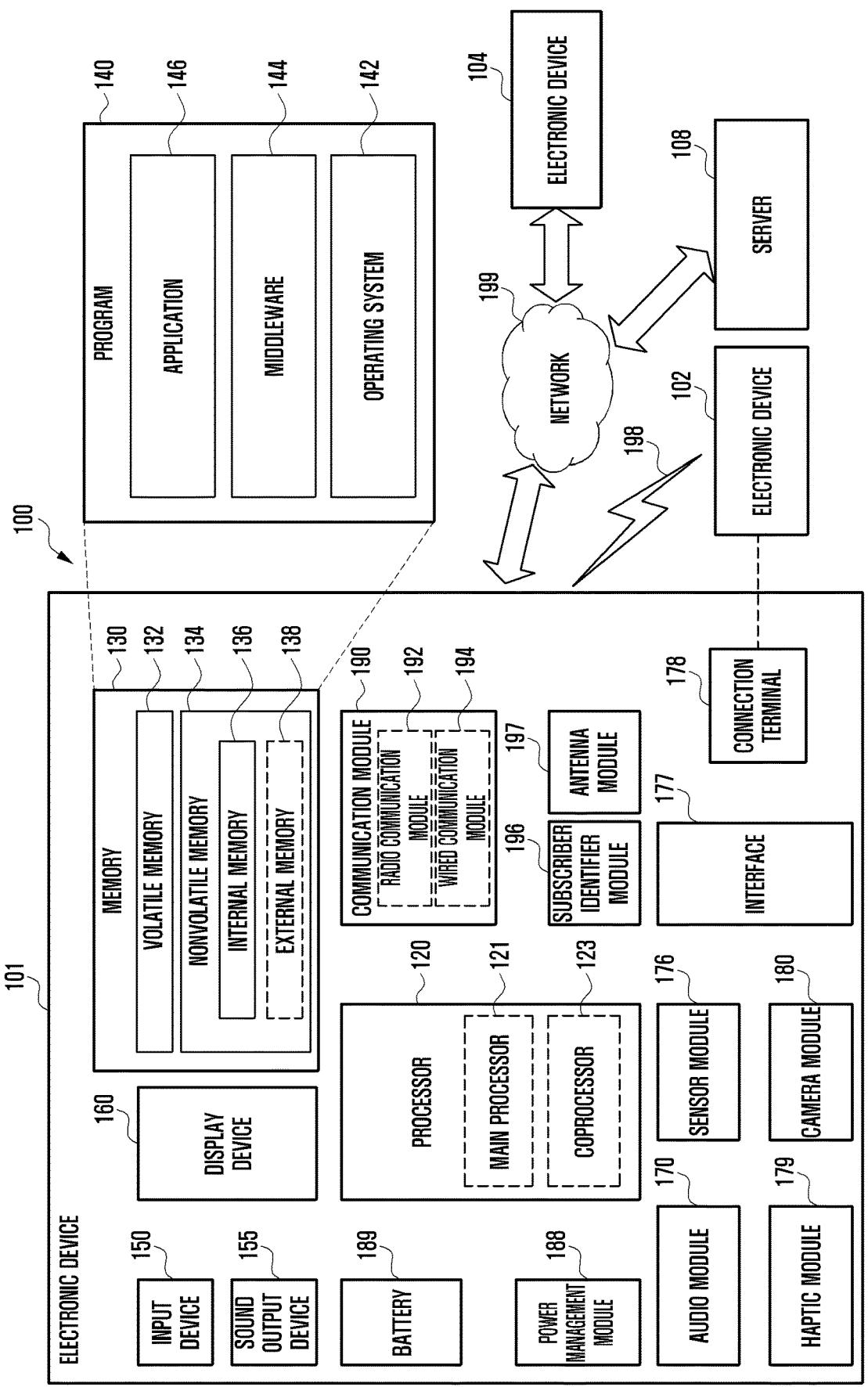
FIG. 1 is a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identifier module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor), and a coprocessor 123 (e.g., a graphics processing unit (GPU), an image signal processor (ISP), a sensor hub processor, or a communication processor (CP)) that is operable independently from, or in conjunction with, the main processor 121. Additionally or alternatively, the coprocessor 123 may be adapted to consume less power than the main processor 121, or to be specific to a specified function. The coprocessor 123 may be implemented as separate from, or as part of the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The coprocessor 123 (e.g., an image signal processor or a communication processor) may be implemented as part of another component (e.g., the camera module 180 or the communication module 190) functionally related to the coprocessor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or a data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more communication processors that are operable independently from the processor 120 (e.g., the application processor) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth®, Wi-Fi direct, a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single integrated circuit or chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identifier module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
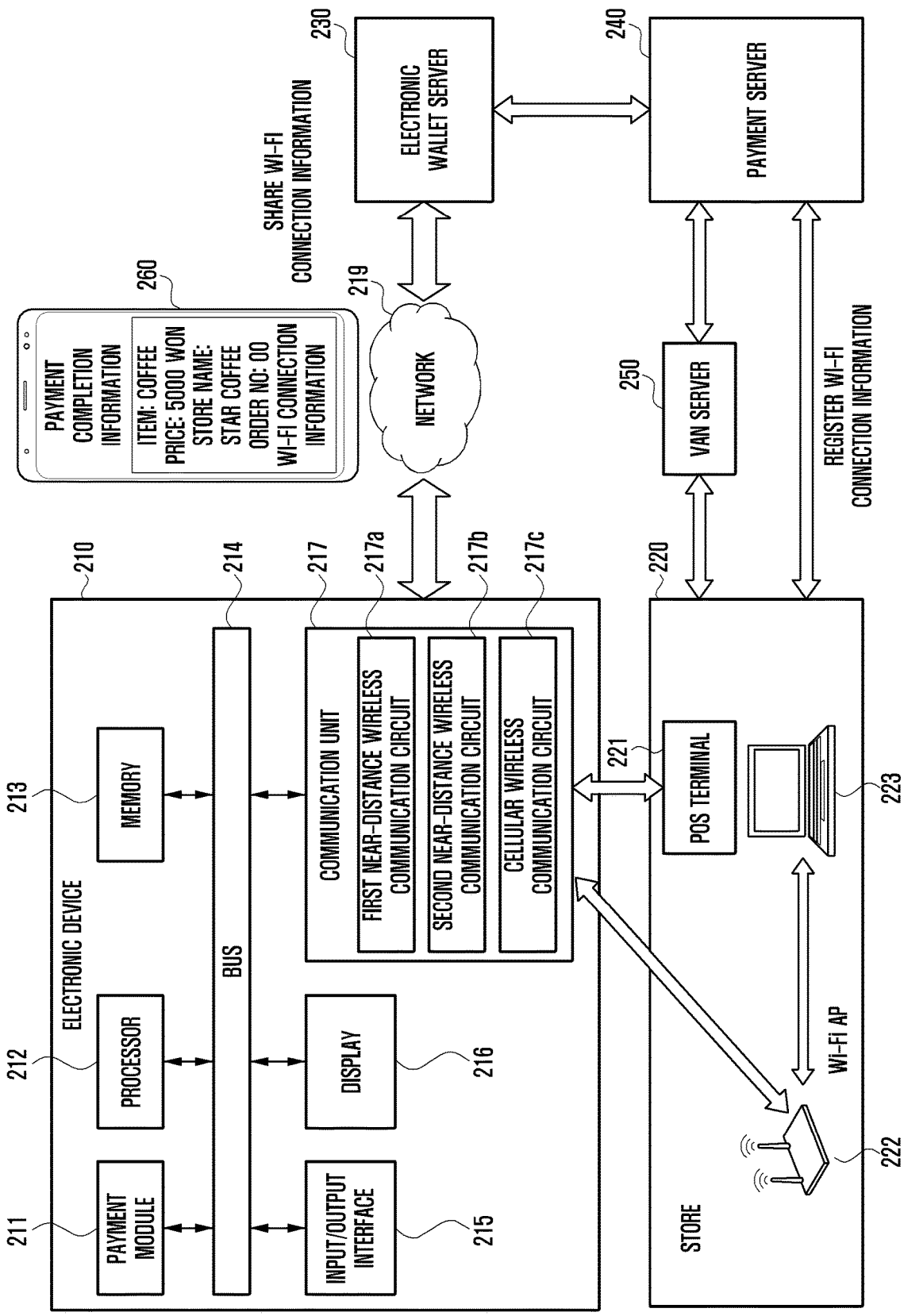
FIG. 2 is a block diagram of an electronic device at an offline merchant according to an embodiment.

FIG. 2 is a block diagram of an electronic device at an offline merchant according to an embodiment.

Referring to FIG. 2, the electronic device 210 may include a payment module 211, a processor 212, a memory 213, a bus 214, an input/output interface 215, a display 216, or a communication unit 217. At least one of the components may be omitted, or additional components may be further included in the electronic device 210.

An electronic device 210 according to an embodiment of the present disclosure may include a housing; a first near-distance wireless communication circuit 217a; a second near-distance wireless communication circuit 217b configured to provide wireless coverage broader than that of the first near-distance wireless communication circuit 217a and configured to support wireless connection to an access point 222; a cellular wireless communication circuit 217c; a touchscreen display 216 exposed through a portion of the housing; a processor 212 positioned in the housing and connected to the first near-distance wireless communication circuit 217a, the second near-distance wireless communication circuit 217b, the cellular wireless communication circuit 217c, and the touchscreen display 216; and a memory 213 positioned in the housing and operatively connected to the processor 212, wherein the memory 213 stores an application program configured to make payment using the first near-distance wireless communication circuit 217a and instructions, and the instructions, when executed, cause the processor 212 to perform a transaction with an external POS terminal 221 via the first near-distance wireless communication circuit 217a using the application program; receive a result of the transaction including receipt information and connection information from an external server via the cellular wireless communication circuit 217c using the application program, the connection information including credential information (which may correspond to authorization information) for connecting the AP; and connect to the AP 222 through the second near-distance wireless communication circuit 217b on the basis of the credential information after receiving the result of the transaction. The first near-distance wireless communication circuit 217a may be configured to use magnetic secure transmission (MST) and/or near-field communication (NFC). The second near-distance wireless communication circuit 217b may be configured to support Wi-Fi. The instructions may, when executed, cause the processor 212 to, in order to perform the transaction obtain a token from the external server by requesting the token; generate payment information on the basis of the obtained token; and transmit the generated payment information to the external POS terminal 221 through the first near-distance wireless communication circuit 217a. The payment information may include identifier (ID) information about the electronic device 210. The credential information may include SSID information about the AP 222 and code information about the AP 222. The credential information may include period information for connection to the AP 222. The instructions, when executed, cause the processor 212 to, when performing the transaction, operate a timer on the basis of the period information; and terminate connection to the AP 222 when the timer expires.

A recording medium according to an embodiment of the present disclosure may record a program to control an operation of an electronic device 210, wherein the electronic device 210 may include a first near-distance wireless communication circuit 217a, a second near-distance wireless communication circuit 217b configured to provide a wireless coverage broader than the first near-distance wireless communication circuit 217a and configured to support wireless connection to an AP 222, and a cellular wireless communication circuit 217c, and the recording medium may record a program to cause the processor 212 to perform a transaction with an external POS terminal 221 via the first near-distance wireless communication circuit 217a using an application program; receive a result of the transaction including receipt information and connection information from an external server via the cellular wireless communication circuit 217c using the application program, the connection information including credential information for connecting to the AP 222; and connect to the AP 222 through the second near-distance wireless communication circuit 217b on the basis of the credential information after receiving the result of the transaction. The credential information may include SSID information about the AP 222 and code information about the AP 222. The credential information may include period information for connection to the AP 222. The recording medium may further record a program to cause the processor 212 to operate a timer on the basis of the period information; and terminate connection to the AP 222 when the timer expires.

According to one embodiment, the payment module 211 may include software and/or a program for supporting an electronic wallet function (e.g., a Samsung Pay function). The electronic wallet function may include, for example, an operation of generating encrypted payment information in response to user authentication through the electronic device 210, an operation of transmitting the generated payment information to an external device (e.g., a POS terminal 221 of the merchant), an operation of receiving payment completion information from another external device (e.g., an electronic wallet server 230) and displaying the received payment completion information 260, or an operation of automatically connecting a Wi-Fi AP 222 of the merchant on the basis of credential information (e.g., a Wi-Fi password) for Wi-Fi connection included in the payment completion information 260. At least part of the payment module 211 may be included in the processor 212 or the memory 213. The payment completion information 260 may include receipt information including an item name, a price, a quantity, a merchant name, or an order number relating to a transaction with the merchant and Wi-Fi connection information with the merchant. The Wi-Fi connection information may include an SSID for connection to the Wi-Fi AP 222, an encrypted key, or a usage period.

The processor 212 may include one or more of a CPU, an application processor, and a CP. The processor 212 may control at least one different component of the electronic device 210, and/or may perform operations relating to communication or data processing.

The memory 213 may include a volatile and/or nonvolatile memory. The memory 213 may store, for example, a command or data related to at least one different component of the electronic device 210. According to one embodiment, the memory 213 may store software and/or a program 140.

The bus 214 may include a circuit that connects the components to each other and delivers communications (e.g., control messages or data) between the components.

The input/output interface 215 may deliver a command or data, which is input from a user or a different external device, to a different component(s) of the electronic device 210 or may output a command or data, which is received from a different component(s) of the electronic device 210, to the user or to the different external device.

The display 216 may include a liquid crystal display (LCD), a light-emitting diode (LED) display, an organic light-emitting diode (OLED) display, a micro-electro-mechanical systems (MEMS) display, or an electronic paper display. The display 216 may include a touchscreen and may receive touch, gesture, proximity, or hovering input using, for example, an electronic pen or a body part of a user.

The communication unit 217 may establish communication, for example, between the electronic device 210 and an external device (e.g., the POS terminal 221, the Wi-Fi AP 222 or an electronic wallet server 230) of a merchant store 220. For example, the communication unit 217 may communicate with the external device (e.g., the POS terminal 221, the Wi-Fi AP 222 or the electronic wallet server 230) via wireless communication or wired communication.

The communication unit 217 may include the first near-distance wireless communication circuit 217a for communicating with the POS terminal 221, the second near-distance wireless communication circuit 217b for connecting to the Wi-Fi AP 222, or the cellular wireless communication circuit 217c for connecting to a cellular network 219 and communicating with the electronic wallet server 230. The first near-distance wireless communication circuit 217a may support an MST and/or an NFC.

The POS terminal 221 or the Wi-Fi AP 222 may be deployed in the merchant store, and a store owner (i.e., a commercial facility) may set an access code, an access right, or an accessible period for the Wi-Fi AP 222 through a computer 223.

The electronic wallet server 230 may be connected to the POS terminal 221 (or merchant server) of the merchant store 220 and a payment server 240 to mediate data transmission/reception.

The payment server 240 may be a device including at least one of a communication service provider server, a credit card company server, a financial institution server, a transportation agency server, and a mobile payment server that perform electronic payments.

A value-added network (VAN) server 250 is a server operated by a value-added common carrier and may be connected to the POS terminal 221 of the merchant and the payment server 240 to mediate requested information from the POS terminal 221 of the merchant for electronic payment and payment and to perform data transmission/reception.

Figure 3:
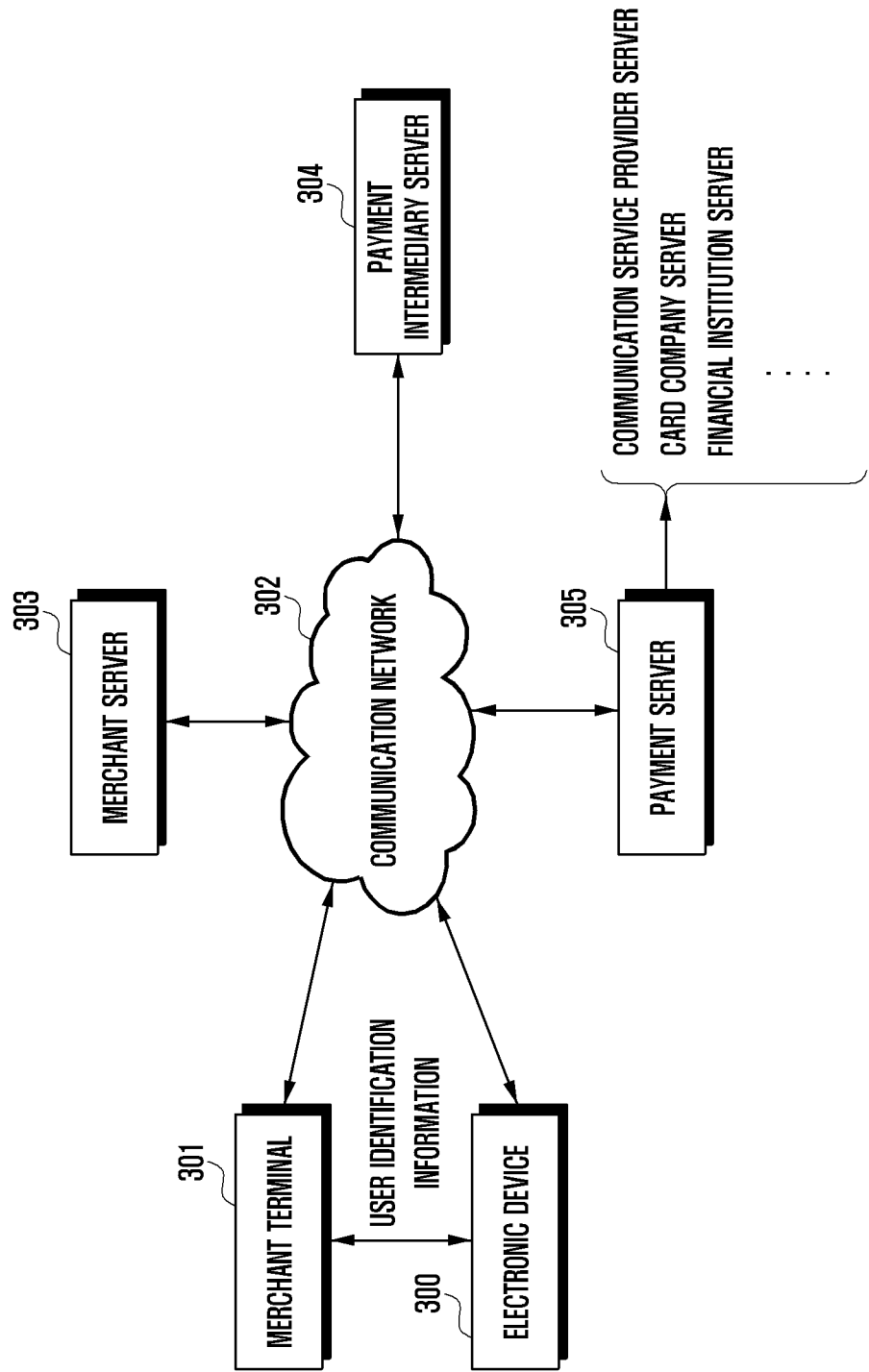
FIG. 3 is a block diagram of a payment system according to an embodiment.

FIG. 3 is a block diagram of a payment system according to an embodiment.

Referring to FIG. 3, the payment system may include an electronic device 300, a merchant terminal 301, a merchant server 303, a payment intermediary server 304, or a payment server 305. The components of the system may be connected to each other via a communications network 302.

A user (e.g., a customer) can purchase goods or services and can make a payment using the electronic device 300, and the electronic device 300 may be configured to make a payment through the merchant terminal 301 (e.g., a POS terminal) provided at the merchant.

The merchant terminal 301 is a device that combines functions of a cash register and a computer terminal and may have not only a function of calculating sales amount but also a function of collecting and providing various pieces of information and data necessary for retail management. The merchant terminal 301 may include a bar code reader, which is an automatic bar code reader, and an order information transfer device (e.g., an NFC communication terminal).

The payment intermediary server 304 is a server operated by a value-added common carrier and may be, for example, a VAN company server or a payment gateway (PG) company server. The payment intermediary server 304 may be connected to the merchant terminal 301 and the payment server 305 to mediate requested information from the merchant terminal 301 for electronic payment and payment and to perform data transmission/reception.

The payment server 305 may include at least one of a communication service provider server, a credit card company server, a financial institution server, a transportation agency server, and a mobile payment server 305 that perform electronic payments. The payment server 305 may be one of the credit card company server, the financial institution server, the transportation agency server, and the mobile payment server 305. The payment server 305 may function to process a payment by reflecting coupon information or discount rate in a payment approval request signal received from the merchant terminal 301 and then to transmit a payment approval result to the electronic device 300 and the merchant terminal 310.

The merchant server 303 may be functionally connected to a plurality of merchant terminals 301. For example, the merchant server 303 may be a server operated by a franchise head office. The merchant server 303 may be functionally connected to the merchant terminal 301 provided at each franchise to store payment-related information about the user and to transmit the stored payment-related information to the merchant terminal 301. The merchant server 303 may identify the payment-related information (e.g., possible payment method information) about the user that is preset by the user from user identification information received from the merchant terminal 301. The merchant server 303 may identify payment-related information (e.g., possible payment method information) on the merchant. The merchant server 305 may provide the payment-related information about the user and/or the payment-related information about the merchant to the electronic device 300, thereby making a payment through the electronic device 300.

The payment server 305 may be any server capable of performing payment-related processing. For example, the payment server 305 may include various servers that perform payment-related processing, such as a communication service provider server, a card company server, and a financial institution server, depending on the payment method or may be connected thereto to process a payment.

The communication network 302 may be configured regardless of communication aspects, such as wired communication and wireless communication, and may be configured as various communication networks, such as a personal area network (PAN), an LAN, a metropolitan network (MAN), and a WAN. The communication network 102 may be a known world wide web (WWW) or may use a wireless transmission technology used for short-distance communication, such as infrared data association or Bluetooth®.

Figure 4:
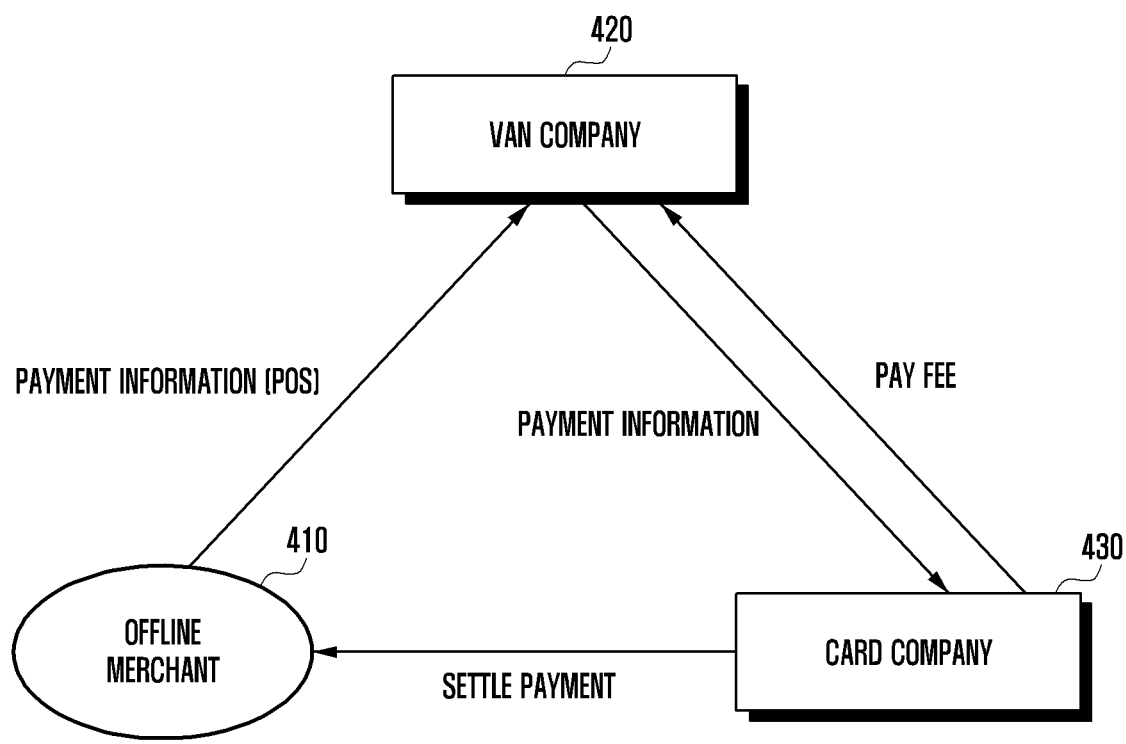
FIG. 4 is a block diagram of an offline payment procedure through a merchant terminal.

FIG. 4 is a block diagram of an offline payment procedure through a merchant terminal.

Referring to FIG. 4, the offline payment procedure through the merchant terminal may be performed as follows. For example, an offline merchant 410 may request a payment through a merchant terminal, for example, a POS terminal 221. The POS terminal 221 may transmit transaction information based on the payment request to a VAN company 420, which is a payment intermediary server. The VAN company 420 may transmit the received transaction information to a corresponding credit card company 430. The credit card company 430 may check the received transaction information and may notify the POS terminal 221 of an offline merchant 410 of transaction approval through the VAN company 420. The offline merchant 410 may confirm that a relevant credit card is normally approved through the POS terminal 221 and may then provide goods or services for a customer. The offline merchant 410 may transmit a sales receipt signed by the customer to the credit card company 430 through the VAN company 420. The credit card company 430 may check the sales receipt received from the offline merchant 410 and, if the sales receipt is normally processed, may deposit a credit sales payment in a bank account of the offline merchant 410 to settle the payment. The credit card company 430 may pay a contracted agency fee to the VAN company 420 to settle the payment.

In a method in which an electronic device automatically connects to an AP, the electronic device may include a first near-distance wireless communication circuit, a second near-distance wireless communication circuit configured to provide wireless coverage broader than that of the first near-distance wireless communication circuit and configured to support wireless connection to the AP, and a cellular wireless communication circuit, and the method may include an operation of performing a transaction with an external POS terminal via the first near-distance wireless communication circuit using an application program; an operation of receiving a result of the transaction including receipt information and connection information from an external server via the cellular wireless communication circuit using the application program, the connection information including credential information for connecting the access point (AP); and an operation of connecting to the AP through the second near-distance wireless communication circuit on the basis of the credential information after receiving the result of the transaction.

The first near-distance wireless communication circuit may be configured to use an MST and/or an NFC. The second near-distance wireless communication circuit may be configured to support Wi-Fi. The performing of the transaction may include obtaining a token from the external server by requesting the token; generating payment information on the basis of the obtained token; and transmitting the generated payment information to the external POS terminal through the first near-distance wireless communication circuit. The payment information may include ID information about the electronic device. The credential information may include SSID information about the AP and code information about the AP. The credential information may include period information for connection to the AP. The connecting to the AP may include operating a timer on the basis of the period information; and terminating connection to the AP when the timer expires.

Figure 5:
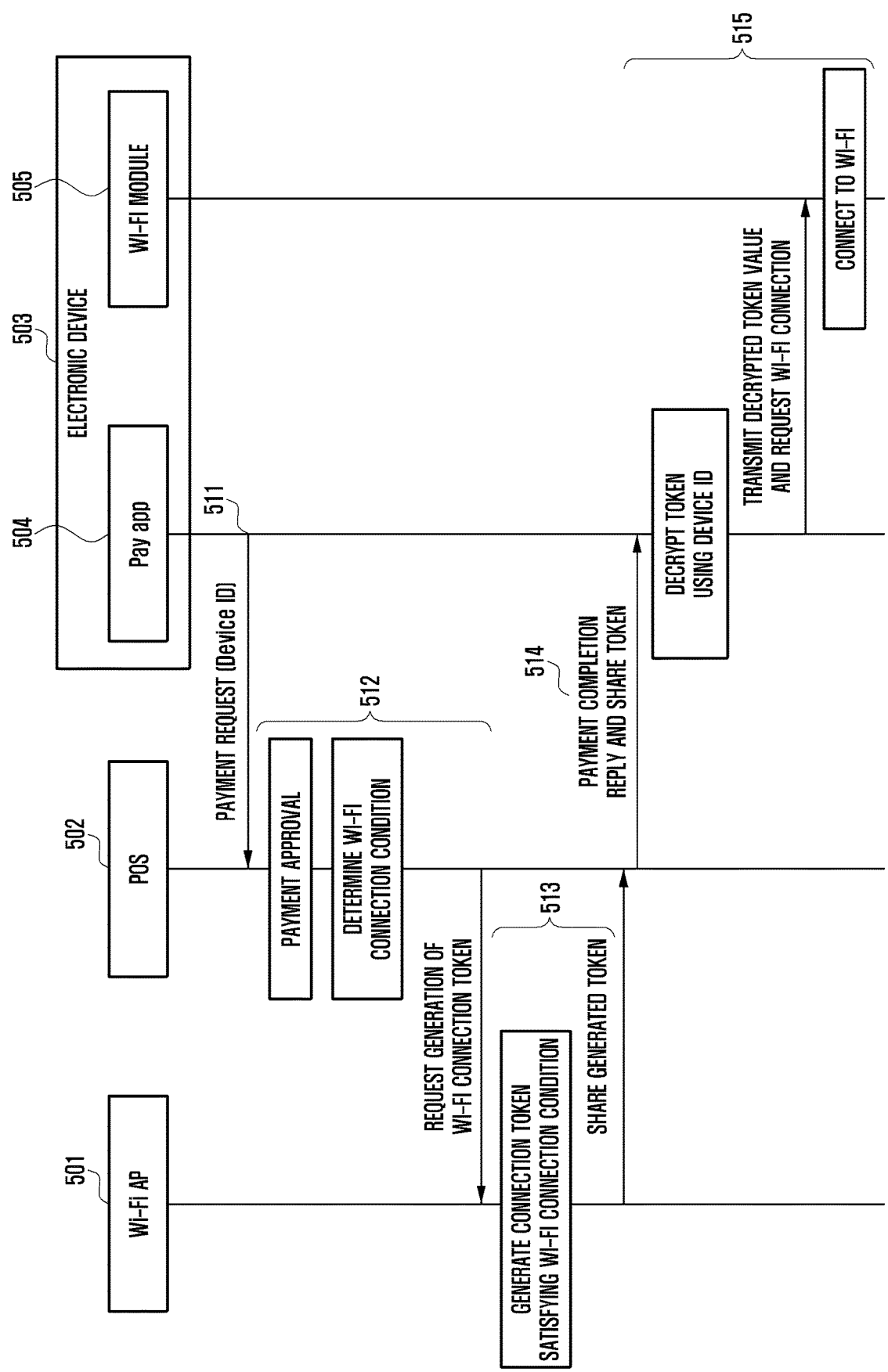
FIG. 5 is a flow diagram of a payment method using an electronic device according to an embodiment.

FIG. 5 is a flow diagram of a payment method using an electronic device according to an embodiment of the present disclosure. The embodiment illustrated in FIG. 5 shows an example in which when an electronic device 503 receives connection information for connecting to Wi-Fi, an entity that determines a condition for transmitting the connection information to the electronic device 503 is a POS terminal 502.

Referring to FIG. 5, in step 511, the electronic device 503 may receive a payment request from a user via a payment application program (or payment app) 504 and may transmit a payment signal to the POS terminal 502 in response to receiving the payment request. The payment signal may include ID information about the electronic device 503, account information about the payment app 504, the serial number (e.g., an international mobile equipment identity (IMEI)), a medium access control (MAC) address or payment information of the electronic device 503, and the like. The payment app 504 may generate payment information in response to the payment request. For example, the payment app 504 may determine a payment method (e.g., an electronic credit card) on the basis of a user input and may request user authentication (e.g., fingerprint authentication and iris authentication) to perform payment. The payment app 504 may obtain a payment token in response to the completion of user authentication and may generate payment information on the basis of the obtained payment token. The payment app 504 may obtain the payment token by requesting the payment token from an external device (e.g., the electronic wallet server 230 or the payment server 240). Alternatively, the payment app 504 may directly generate a payment token on the basis of an encrypted key stored in a memory 213 of the electronic device 503. For example, the payment app 504 may obtain the payment token through a program associated with a payment method (e.g., a credit card) selected by the user in response to the payment request from the user. For example, the payment app 504 may obtain the payment token through a program associated with a credit card selected by the user. The program may be installed in a trusted execution environment (TEE), such as TrustZone, or may be installed in an embedded secure element (ESE). The program may be a software development kit (SDK) program distributed by a credit card company.

The payment app 504 may transmit the generated payment information to the POS terminal 502 through a first near-distance wireless communication circuit 217a. The first near-distance wireless communication circuit 217a may be configured to support MST and/or NFC.

In step 512, the POS terminal 502 may perform payment approval in response to the payment request received from the electronic device 503. For example, the POS terminal 502 may transmit transaction information based on the payment request to a payment intermediary server (e.g., the VAN company 420), and the VAN company 420 may transmit the received transaction information to a relevant credit card company 430. The credit card company 430 may check the received transaction information and may then notify the POS terminal 502 of payment approval via the VAN company 420. The POS terminal 502 may determine a Wi-Fi connection condition in response to the payment approval. For example, the POS terminal 502 may determine credential information for connecting to a Wi-Fi AP 501 on the basis of a specified amount of money or the number of products sold. The credential information may include the number of devices allowed to connect to the Wi-Fi AP 501 and connection time. The POS terminal 502 may request the Wi-Fi AP 501 to generate a Wi-Fi connection token on the basis of the determined credential information.

In step 513, the Wi-Fi AP 501 may generate a Wi-Fi connection token that matches the credential information in response to the Wi-Fi token generation request received from the POS terminal 502 and may transmit the generated Wi-Fi connection token to the POS terminal 502. The Wi-Fi connection token may include an SSID for connecting to the Wi-Fi AP 501, an encrypted key, or a usage period.

In step 514, upon receiving the Wi-Fi connection token from the Wi-Fi AP 501, the POS terminal 502 may generate receipt information and Wi-Fi connection information and may transmit the generated receipt information and Wi-Fi connection information to the electronic device 503. The POS terminal 502 may encrypt the Wi-Fi connection token on the basis of the ID information about the electronic device 503 previously received from the electronic device 503 and may transmit the encrypted Wi-Fi connection token as the Wi-Fi connection information.

In step 515, upon receiving the receipt information and the Wi-Fi connection information from the POS terminal 502, the payment app 504 may automatically perform a connection to the Wi-Fi AP 501. For example, the payment app 504 may decrypt the Wi-Fi connection token on the basis of the ID information about the electronic device 503 and may transmit the decrypted value (or information) to a Wi-Fi module 505 (e.g., the second near-distance wireless communication circuit 217b) of the electronic device 503.

The Wi-Fi module 505 of the electronic device 503 may perform a connection to the Wi-Fi AP 501 on the basis of the Wi-Fi connection token.

The Wi-Fi connection token may not be separately specified as a method for distinguishing and authenticating the electronic device 503. For example, the Wi-Fi AP 501 may authenticate the electronic device 503 requesting a connection by comparing ID information about the electronic device 503 requesting the connection with previously stored ID information about the electronic device 503. For example, the electronic device 503 may transmit a payment request to the POS terminal 502, and the POS terminal 502 may transmit the ID information about the electronic device 503 to the Wi-Fi AP 501 in response to the payment request. The Wi-Fi AP 501 may store the ID information about the electronic device 503 received from the POS terminal 502, and may receive a connection request from the electronic device 503 after storing the ID information about the electronic device 503. Upon receiving the connection request from the electronic device 503, the Wi-Fi AP 501 may compare the ID information about the electronic device 503 requesting the connection with the previously stored ID information about the electronic device 503 and may allow the connection of the electronic device 503 if the ID information about the electronic device 503 requesting the connection is the same as the previously stored ID information about the electronic device 503.

Figure 6:
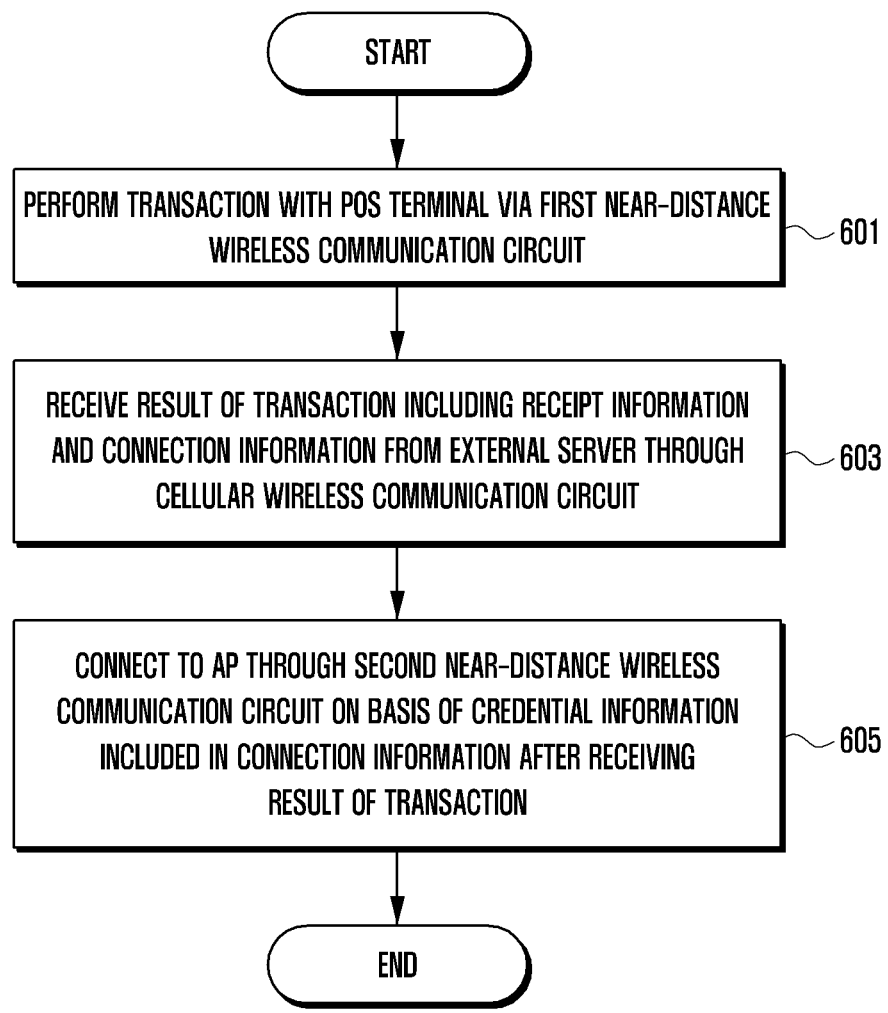
FIG. 6 is a flowchart of a method of an electronic device according to an embodiment.

FIG. 6 is a flowchart of a method of an electronic device according to an embodiment of the present disclosure. FIG. 6 shows an example in which an external server 230 transmits Wi-Fi connection information to an electronic device 210.

Referring to FIG. 6, in step 601, the electronic device 210 may receive a request associated with a payment and may perform a transaction with a POS terminal 221 via a first near-distance wireless communication circuit 217a in response to the request.

In step 603, the electronic device 210 may receive the result of the transaction including receipt information and connection information from an external server 230 through a cellular wireless communication circuit 217c. The connection information may be configured such that the POS terminal 221 transmits Wi-Fi connection information to the external server 230 after receiving a payment request from the electronic device 201 and the external server 230 transmits the Wi-Fi connection information received from the POS terminal 221 to the electronic device 210. An embodiment is described below in greater detail with reference to FIG. 7. The connection information may be configured such that Wi-Fi connection information about a merchant is shared in advance with the external server 230 before the electronic device 210 transmits a payment request, and the external server 230 transmits the Wi-Fi connection information shared with the merchant to the electronic device 210 when a payment is made through the electronic device 210. An embodiment is described below in greater detail with reference to FIG. 8.

In step 605, after receiving the result of the transaction including the receipt information and the connection information, the electronic device 210 may connect to a Wi-Fi AP 222 of the merchant through a second near-distance wireless communication circuit 217b on the basis of credential information included in the connection information.

Figure 7:
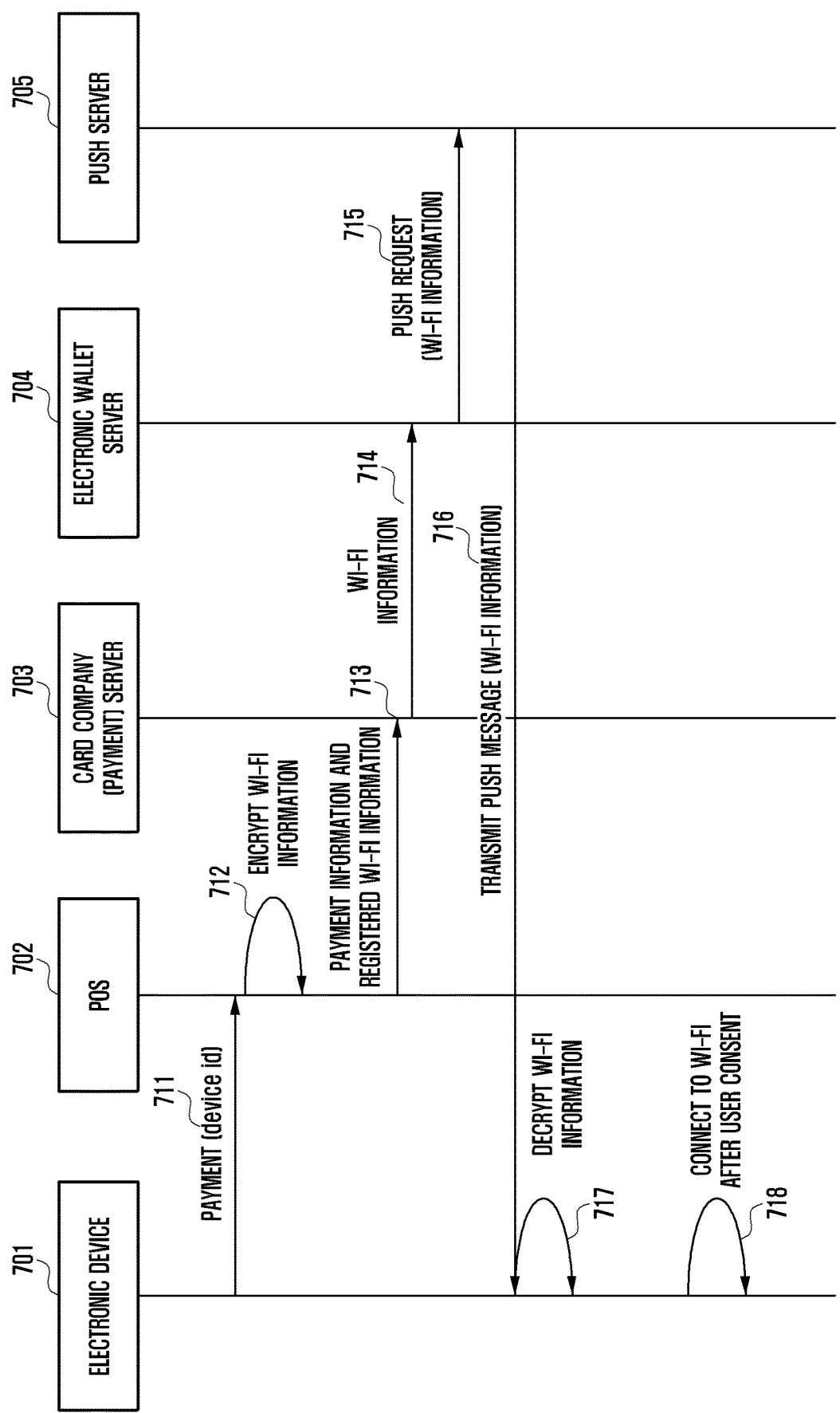
FIG. 7 is a flow diagram of a payment method using an electronic device according to an embodiment.

FIG. 7 is a flow diagram of a payment method using an electronic device 701 according to an embodiment of the present disclosure. FIG. 7 shows an example in which a POS terminal 702 transmits Wi-Fi connection information to a credit card company server 703, the credit card company server 703 transmits the received Wi-Fi connection information to an electronic wallet server 704230, and the electronic wallet server 704 transmits the Wi-Fi connection information to the electronic device 701 through a push server 705.

Referring to FIG. 7, in step 711, the electronic device 701 may receive a payment request from a user via a payment app 504 and may transmit a payment signal to the POS terminal 702 in response to the received payment request. The payment signal may include ID information or payment information about the electronic device 701. The electronic device 701 may generate the payment information using the payment app 504 to in response to the payment request. For example, the payment app 504 may determine a payment method (e.g., an electronic credit card) on the basis of a user input and may request user authentication (e.g., fingerprint authentication and iris authentication) to perform payment. The payment app 504 may obtain a payment token in response to the completion of user authentication and may generate payment information on the basis of the obtained payment token. The payment app 504 may request the electronic wallet server 704 to issue the payment token and may obtain the payment token from the electronic wallet server 704. The payment app 504 may request the credit card company server 703 to issue the payment token and may obtain the payment token from the card company server 703. Alternatively, the payment app 504 may directly generate a payment token on the basis of an encrypted key stored in a memory 213 of the electronic device 701. The payment app 504 may transmit the generated payment information to the POS terminal 702 through a first near-distance wireless communication circuit 217a. The first near-distance wireless communication circuit 217a may be configured to support MST and/or NFC.

In step 712, the POS terminal 702 may determine credential information for connecting to a Wi-Fi AP 222 on the basis of a specified amount of money or the number of products sold in response to the payment request received from the electronic device 701 and may generate and encrypt Wi-Fi connection information (e.g., the Wi-Fi connection token in FIG. 5) on the basis of the determined credential information. The POS terminal 702 may include a token generation module that generates a Wi-Fi connection token that matches credential information in response to a payment request received from the electronic device 701. The Wi-Fi connection token may include an SSID for connecting to the Wi-Fi AP 501, an encrypted key, or a usage period. In step 713, the POS terminal 702 may transmit the payment information and the encrypted Wi-Fi connection information based on the payment request to the credit card company server 703 via a payment intermediary server (e.g., the VAN company 420).

In step 714, the credit card company server 703 may check received transaction information, notify the electronic wallet server 704 of payment approval, and transmit the Wi-Fi connection information to the electronic wallet server 704.

In step 715, the electronic wallet server 704 may request the push server 705 to forward a notification of payment approval and the Wi-Fi connection information in the form of a push message. In step 716, the push server 705 may notify the electronic device 701 of the payment approval and may transmit the Wi-Fi connection information to the electronic device 701 in response to the push request from the electronic wallet server 704.

Upon receiving the Wi-Fi connection information from the push server 705 using the payment app 504, the electronic device 701 may automatically connect to the Wi-Fi AP 222 in step 717. For example, the payment app 504 may decrypt the Wi-Fi connection token on the basis of the ID information about the electronic device 701. After decrypting the Wi-Fi connection token, in step 718, the electronic device 701 may request user consent (user confirmation) and may perform a connection to the Wi-Fi AP 222 on the basis of the Wi-Fi connection token via a second near-distance wireless communication circuit 217*b* of the electronic device 701. After decrypting the Wi-Fi connection token, in step 718, the electronic device 701 may automatically perform a connection to the Wi-Fi AP 222 on the basis of the Wi-Fi connection token via the second near-distance wireless communication circuit 217*b* of the electronic device 701 without requesting user consent (user confirmation).

Figure 8:
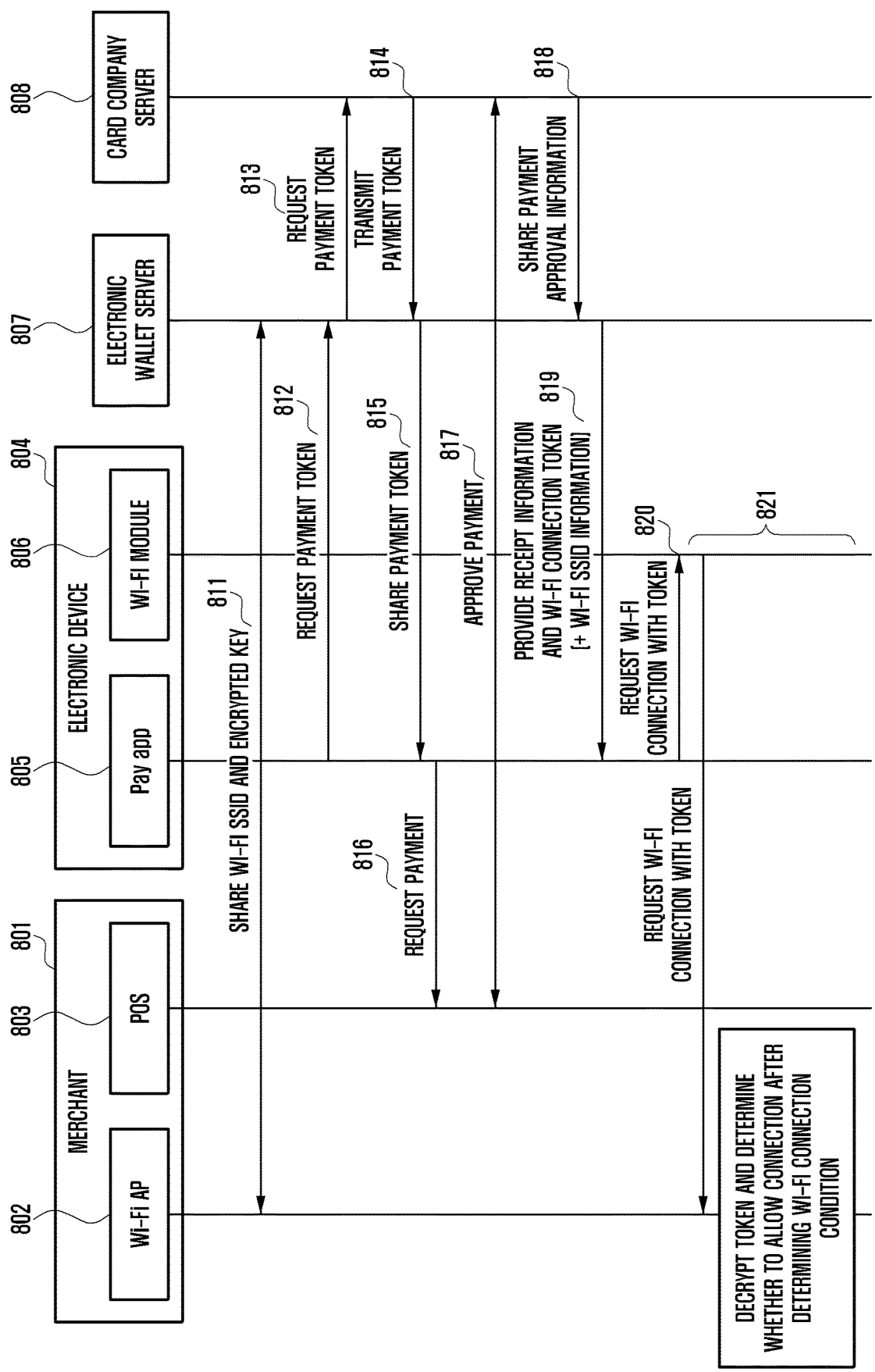
FIG. 8 is a flow diagram of a payment method using an electronic device according to an embodiment.

FIG. 8 is a flow diagram of a payment method using an electronic device according to an embodiment of the present disclosure. FIG. 8 shows an example in which Wi-Fi connection information about a merchant is shared in advance with an external server 230 before an electronic device 210 transmits a payment request, and the external server 230 transmits the Wi-Fi connection information shared with the merchant to the electronic device when payment is performed through the electronic device 210.

Referring to FIG. 8, in step 811, a merchant 801 may register connection information about a Wi-Fi AP 802 in advance in an electronic wallet server 807. For example, a manager of the merchant 801 may connect to the electronic wallet server 807 through a merchant server or through a website linked to the electronic wallet server 807 and may register an SSID for connecting to the Wi-Fi AP 802, an encrypted key, or a usage period as the connection information about the Wi-Fi AP 802 of the merchant.

In step 812, the electronic device 804 may receive a payment request from a user via a payment app 805 and may generate payment information in response to the received payment request. For example, the payment application 805 may determine a payment method (e.g., an electronic credit card) on the basis of a user input and may request user authentication (e.g., fingerprint authentication and iris authentication) to perform payment. The payment app 805 may request a payment token from the electronic wallet server 807 in response to the completion of user authentication.

In step 813, the electronic wallet server 807 may forward a payment token request received from electronic device 804 to a credit card company server 808. In step 814, the electronic wallet server 807 may obtain a payment token from the credit card company server 808. In step 815, the electronic wallet server 807 may transmit the payment token obtained from the credit card company server 808 to the electronic device 804. Alternatively, the electronic device 804 may directly generate a payment token using the payment app 805 on the basis of an encrypted key stored in a memory 213 of the electronic device 804.

The payment app 805 may generate payment information on the basis of the obtained payment token. In step 816, the payment app 805 may transmit the generated payment information to a POS terminal 803 via a first near-distance wireless communication circuit 217*a*. The first near-distance wireless communication circuit 217*a* may be configured to support MST and/or NFC.

In step 817, the POS terminal 803 may transmit the payment information based on the payment request received from the electronic device 804 to the credit card company server 808 via a payment intermediary server (e.g., the VAN company 420).

In step 818, the card company server 808 may check received transaction information and may notify the electronic wallet server 807 of payment approval.

In step 819, the electronic wallet server 807 may determine credential information for connecting to the Wi-Fi AP 802 on the basis of a specified amount of money or the number of products sold. The electronic wallet server 807 may generate Wi-Fi connection information (e.g., an SSID, an encrypted key, or a usage period) to include the determined credential information using the encrypted key registered (shared) in advance by the merchant 801 as the connection information about the Wi-Fi AP 802 and may encrypt at least some (e.g., the encrypted key or usage period) of the generated connection information. The electronic wallet server 807 may notify the electronic device 804 of payment approval and may transmit the generated Wi-Fi connection information to the electronic device 804.

In step 820, upon receiving receipt information and the Wi-Fi connection information from the electronic wallet server 807, the payment app 805 may automatically perform a connection to the Wi-Fi AP 802. For example, the payment app 805 may transmit data encrypted with information related to a connection condition, such as the Wi-Fi connection information received from the electronic wallet server 807, for example, the SSID, the encrypted key, or the usage period, to a Wi-Fi module 806 (e.g., the second near-distance wireless communication circuit 217*b*), thereby requesting the Wi-Fi module 805 to connect to the Wi-Fi AP 802. In step 821, the Wi-Fi module 806 of the electronic device 804 may attempt to connect to the Wi-Fi AP 802 by transmitting the encrypted data to the Wi-Fi AP 802. The Wi-Fi AP 802 may decrypt the encrypted key received from the Wi-Fi module 806 of the electronic device 804 and may determine whether to allow the connection of the electronic device 804 on the basis of the decrypted encrypted key. The Wi-Fi AP 802 may determine whether to allow the connection of the electronic device 804 on the basis of additional information, for example, a usage period and an allowed number of devices, received from the Wi-Fi module 806 of the electronic device 804.

Figure 9:
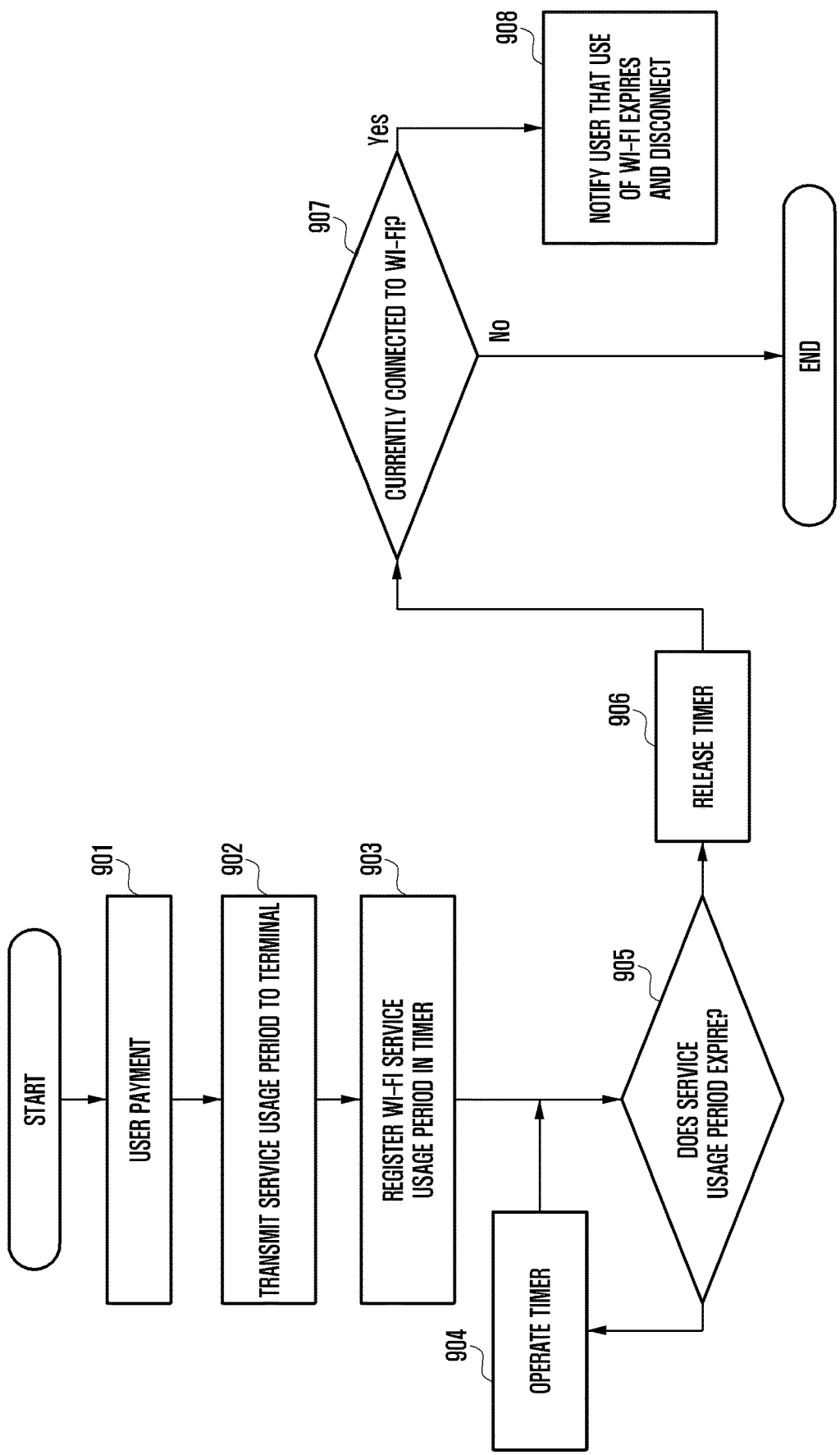
FIG. 9 is a flowchart of a method of an electronic device configured to set a period of connection to a Wi-Fi AP.

FIG. 9 is a flowchart of a method of an electronic device configured to set a period of connection to a Wi-Fi AP.

Referring to FIG. 9, an electronic device 210 has a period of connection to a Wi-Fi AP 222 set to automatically expire.

In step 901, the electronic device 210 may receive a request associated with a payment and may perform a transaction with a POS terminal 221 through a first near-distance wireless communication circuit 217*a* using a payment app 504 in response to the request.

In step 902, the electronic device 210 may receive the result of the transaction including receipt information and connection information from an electronic wallet server 230 through a cellular wireless communication circuit 217*c*. The electronic device 210 may perform payment using an NFC method. For example, when the electronic device 210 performs payment using the NFC method, the electronic device 210 may receive the connection information for connecting to the Wi-Fi AP 222 from the POS terminal 221 through NFC communication. The connection information received from the electronic wallet server 230 may include an SSID for connecting to a Wi-Fi AP 222, an encrypted key, or a usage period. The usage period may include a service start time and a service expiration time.

In step 903, the electronic device 210 may automatically connect to the Wi-Fi AP 222 on the basis of the connection information and may register the usage period (connection period) of the Wi-Fi AP 222 in a timer on the basis of received period information. For example, the payment app 504 of the electronic device 210 may generate a timer task on the basis of the received period information and may transmit the timer task to a Wi-Fi module 1005.

In steps 904, 905, and 906, the electronic device 210 may operate the registered timer and may release the timer when the service usage period expires. For example, when the period information received from the electronic wallet server 230 is two hours, the electronic device 210 may operate the timer set to two hours. When the set period of the timer, for example, two hours, elapses, the electronic device 210 may release the timer.

In steps 907 and 908, the electronic device 210 may determine whether the electronic device 210 is connected to the Wi-Fi AP 222 of the merchant as Wi-Fi with advanced security even after the expiration of the timer, and may disconnect from the Wi-Fi AP 222 and may display a notification indicating the expiration of the Wi-Fi service if the electronic device 210 is connected to the Wi-Fi AP 222.

Figure 10:
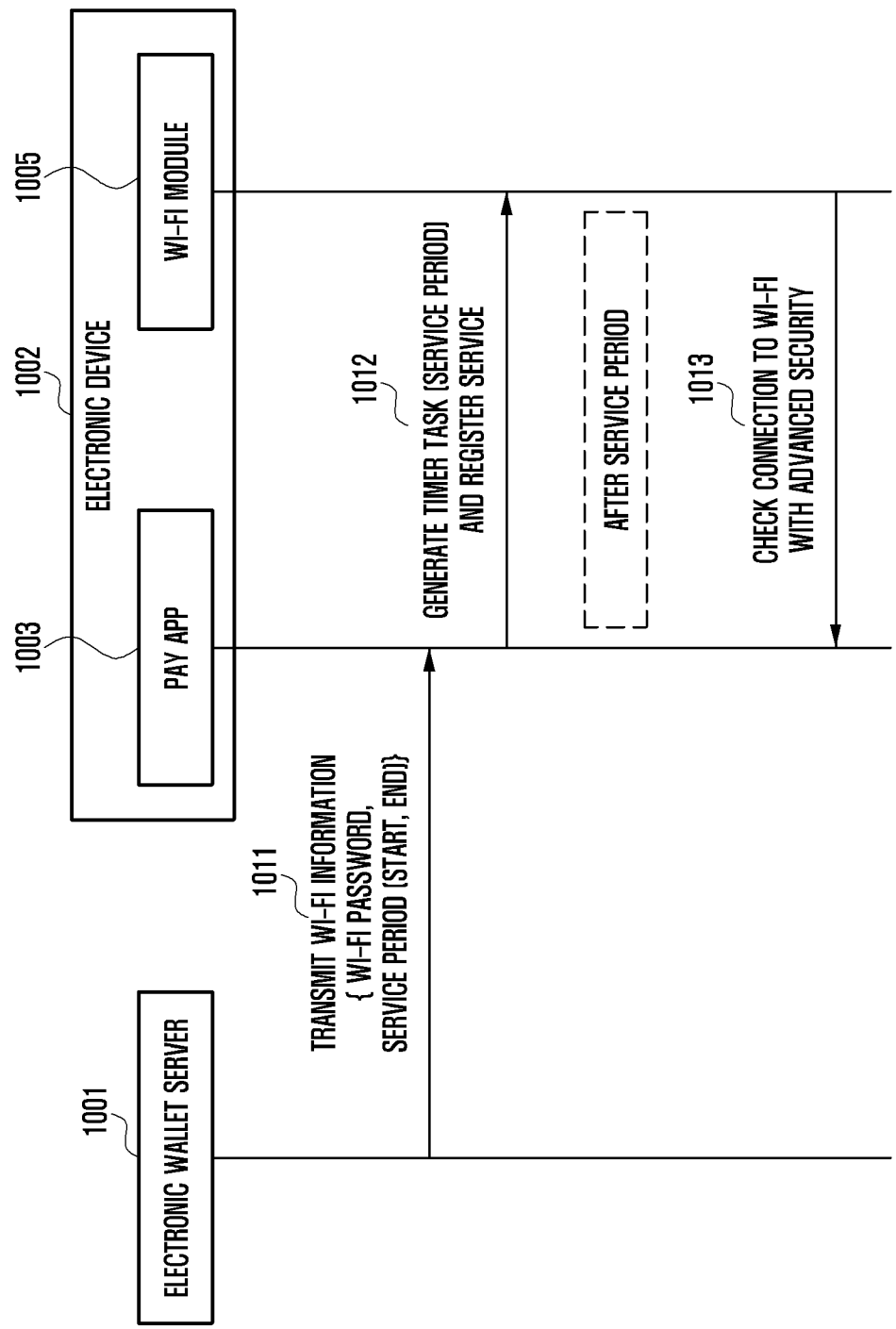
FIG. 10 is a flow diagram of an electronic device having a period of connection to a Wi-Fi AP set to automatically expire.

FIG. 10 is a flow diagram of an electronic device 1002 having a period of connection to a Wi-Fi AP set to automatically expire.

Referring to FIG. 10, in step 1011, the electronic device 1002 may perform a transaction with a POS terminal 221 through a first near-distance wireless communication circuit 217a using a payment app 1003 and may receive the result of the transaction including receipt information and connection information from an electronic wallet server 1001 through a cellular wireless communication circuit 217c. The electronic device 1002 may perform payment using an NFC method. For example, when the electronic device 1002 performs payment using the NFC method, the electronic device 1002 may receive the connection information for connecting to the Wi-Fi AP 222 from the POS terminal 221 through NFC communication. The connection information received from the electronic wallet server 230 may include an SSID for connecting to a Wi-Fi AP 222, an encrypted key, or a usage period. The usage period may include a service start time and a service expiration time.

In step 1012, the payment app 1003 of the electronic device 1002 may generate a timer task on the basis of the received period information and may transmit the timer task to a Wi-Fi module 1005. The Wi-Fi module 1005 of the electronic device 1002 may operate a timer on the basis of the received timer task, and may release the timer when the service usage period expires. For example, when the period information received from the electronic wallet server 1001 is two hours, the Wi-Fi module 1005 may operate the timer set to two hours. When the set period of the timer, for example, two hours, elapses, the Wi-Fi module 1005 may release the timer.

In step 1013, the electronic device 1002 may determine whether the electronic device 1002 is connected to the Wi-Fi AP 222 of a merchant as Wi-Fi with advanced security after the expiration of the timer. For example, when the timer expires, the Wi-Fi module 1005 may disconnect from the Wi-Fi AP 222 and may notify the payment app 1003 that the Wi-Fi module 1005 is disconnected from the Wi-Fi AP 222. Upon receiving disconnection information, the payment app 1003 may display a notification indicating that the use of the advanced-security Wi-Fi service has expired.

As described above, various embodiments enable a user that performs payment using an electronic wallet function of an electronic device at the offline merchant to automatically connect to Wi-Fi of the offline merchant, thus improving user convenience. Further, the various embodiments of the present disclosure allow only a customer that purchases goods or services to connect Wi-Fi at a commercial facility, thereby providing a Wi-Fi service with improved security and high performance for the customer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. However, the electronic devices are not intended to be limited to the embodiments described above.

It should be appreciated that various embodiments of the present disclosure and the terms used therein are not intended to limit the present disclosure to particular embodiments but includes various changes, equivalents, or replacements for a corresponding embodiment. With regard to the description of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$," "2nd," "first," and "second" may be used to simply distinguish a corresponding component from another component, but is not intended to limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the one or more instructions, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, but does not include a signal (e.g., an electromagnetic wave). and this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a non-transitory machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the non-transitory machine-readable storage medium, such as memory of a manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a housing;
a first near-distance wireless communication circuit;
a second near-distance wireless communication circuit configured to provide a wireless coverage broader than the first near-distance wireless communication circuit, and support wireless connection to an access point (AP);
a cellular wireless communication circuit;
a touchscreen display exposed through a portion of the housing;
a processor positioned in the housing and connected to the first near-distance wireless communication circuit, the second near-distance wireless communication circuit, the cellular wireless communication circuit, and the touchscreen display; and
a memory positioned in the housing and operatively connected to the processor, wherein the memory is configured to store an application program configured to make payment using the first near-distance wireless communication circuit, and instructions, wherein the instructions, when executed, cause the processor to:
perform a transaction with an external point-of-service (POS) device via the first near-distance wireless communication circuit using the application program;
receive a result of the transaction comprising receipt information and connection information from an external server via the cellular wireless communication circuit using the application program, wherein the connection information comprises credential information for connecting to the AP; and
automatically connect to the AP through the second near-distance wireless communication circuit based on the credential information after receiving the result of the transaction,
wherein the credential information comprises service set identifier (SSIP) information about the AP, code information about the AP, and period information for connection to the AP, and
wherein the instructions, when executed, further cause the processor to, when performing the transaction: operate a timer based on the period information, and terminate connection to the AP when the timer expires.

2. The electronic device of claim 1, wherein the first near-distance wireless communication circuit is configured to use at least one of magnetic secure transmission (MST) or near field communication (NFC).

3. The electronic device of claim 2, wherein the second near-distance wireless communication circuit is further configured to use wireless fidelity (Wi-Fi) communication.

4. The electronic device of claim 1, wherein the instructions, when executed, further cause the processor to, in order to perform the transaction:
obtain a token from the external server by requesting the token;
generate payment information based on the obtained token; and
transmit the generated payment information to the external POS device through the first near-distance wireless communication circuit.

5. The electronic device of claim 4, wherein the payment information comprises identifier (ID) information about the electronic device.

6. A method for an electronic device to automatically connect to an access point, wherein the electronic device comprises a first near-distance wireless communication circuit, a second near-distance wireless communication circuit configured to provide a wireless coverage broader than the first near-distance wireless communication circuit and support wireless connection to an access point (AP), and a cellular wireless communication circuit, the method comprising:
performing a transaction with an external point-of-service (POS) device via the first near-distance wireless communication circuit using an application program;
receiving a result of the transaction comprising receipt information and connection information from an external server via the cellular wireless communication circuit using the application program, wherein the connection information comprises credential information for connecting to the AP; and
automatically connecting to the AP through the second near-distance wireless communication circuit based on the credential information after receiving the result of the transaction;
wherein the credential information comprises service set identifier (SSIP) information about the AP, code information about the AP, and period information for connection to the AP, and wherein the instructions, when executed, further cause the processor to, when performing the transaction: operate a timer based on the period information, and terminate connection to the AP when the timer expires.

7. The method of claim 6, wherein the first near-distance wireless communication circuit is configured to use at least one of magnetic secure transmission (MST) or near field communication (NFC).

8. The method of claim 6, wherein the second near-distance wireless communication circuit is further configured to use wireless fidelity (Wi-Fi) communication.

9. The method of claim 6, wherein performing the transaction comprises:
obtaining a token from the external server by requesting the token;
generating payment information based on the obtained token; and
transmitting the generated payment information to the external POS device through the first near-distance wireless communication circuit.

10. The method of claim 9, wherein the payment information comprises identifier (ID) information about the electronic device.

11. A non-transitory machine-readable storage medium that records a program to control an operation of an electronic device, wherein the electronic device comprises a first near-distance wireless communication circuit, a second near-distance wireless communication circuit configured to provide a wireless coverage broader than the first near-distance wireless communication circuit and configured to support wireless connection to an access point (AP), a cellular wireless communication circuit, and a processor, and wherein the program causes the processor to:

perform a transaction with an external point-of-service (POS) device via the first near-distance wireless communication circuit using an application program;

receive a result of the transaction comprising receipt information and connection information from an external server via the cellular wireless communication circuit using the application program, wherein the connection information comprises credential information for connecting to the AP; and automatically connect to the AP through the second near-distance wireless communication circuit based on the credential information after receiving the result of the transaction, wherein the credential information comprises service set identifier (SSIP) information about the AP, code information about the AP, and period information for connection to the AP, and wherein the instructions, when executed, further cause the processor to, when performing the transaction: operate a timer based on the period information, and terminate connection to the AP when the timer expires.

\* \* \* \* \*